April 30, 1968     E. HESTER ET AL     3,380,432

MACHINE FOR BREADING FOOD PRODUCTS

Filed June 15, 1966     2 Sheets-Sheet 1

INVENTORS
Edgar Hester
L. C. Price

BY
Scofield, Kokjer, Scofield & Lowe
ATTORNEYS

April 30, 1968     E. HESTER ET AL     3,380,432
MACHINE FOR BREADING FOOD PRODUCTS
Filed June 15, 1966     2 Sheets-Sheet 2

INVENTORS
Edgar Hester
L. C. Price

BY
ATTORNEYS

United States Patent Office 3,380,432
Patented Apr. 30, 1968

3,380,432
MACHINE FOR BREADING FOOD PRODUCTS
Edgar Hester and La Vaun C. Price, Lincoln, Nebr., assignors to Edco, Inc., Lincoln, Nebr., a corporation of Nebraska
Filed June 15, 1966, Ser. No. 557,791
9 Claims. (Cl. 118—16)

ABSTRACT OF THE DISCLOSURE

A continuously rotating horizontal turntable has a peripheral trough in which products to be breaded are laid in successive fashion. As the turntable rotates, the products are covered automatically by a scraper mechanism which serves to intercept and move crumbs outwardly from the center portion of the turntable into the trough. The turntable carries the covered products through a pressure zone and thereafter a plow-like element removes the breaded products from the trough toward the center of the turntable from whence they can be removed. A portion of the crumbs remain in the trough to form a bed on which the succeeding products are laid.

---

This invention relates generally to food preparation equipment and deals more specifically with a machine for applying bread crumbs to various food products such as, for example, onion rings, shrimp and the like, which are subsequently deep or French fried or otherwise cooked.

In the breading of food products, the usual practice is to dip the product in a batter and then apply bread crumbs thereto, the batter being relied upon to adhere the crumbs to the product. If done manually, this is a time consuming task. For large restaurants and institutional kitchens, automatic or semi-automatic breading machines have been developed. However, those of which we are aware are too large and costly to be efficiently employed in a small cafe or drive-in restaurant or other facility having limited kitchen premises and/or over-all food volume.

One of the principal objects of the present invention is to provide a relatively compact and inexpensive machine for assisting in the breading of food products and which has a special suitability for use in the smaller establishments referred to above. The machine is substantially automatic in the breading operation itself, requiring manual operations only in the application of batter to the product, feeding thereof to the machine, and the removal of the completely breaded product. One person can work with the machine in producing breaded products rapidly and with ease and facility.

Another object of the invention is to provide a machine of the character described which operates to apply bread crumbs to both sides of the product in a substantially uniform manner. A special feature of the invention resides in the manner in which the products to be breaded are coated with the crumbs and subsequently exposed for removal from the machine.

In a summarized sense, the invention contemplates the provision of a rotating turntable having a supply of crumbs associated therewith. Means are included in connection with the turntable to direct the crumbs into specific areas which also receive the products to be breaded. Compression means press the crumbs into firm contact with the batter treated products in order to firmly adhere the crumbs thereto and the breaded products are automatically extracted from embedment in the bed of crumbs as the turntable moves. An operator standing in one position relative to the turntable can both feed batter treated products to the unit and remove fully breaded ones therefrom.

Other objects and advantages of the invention, together with the features of novelty appurtenant thereto, will appear in the course of the following description.

In the accompanying drawings, which form a part of the specification and are to be read in conjunction therewith and in which like reference numerals indicate like parts in the various views.

Figure 1:
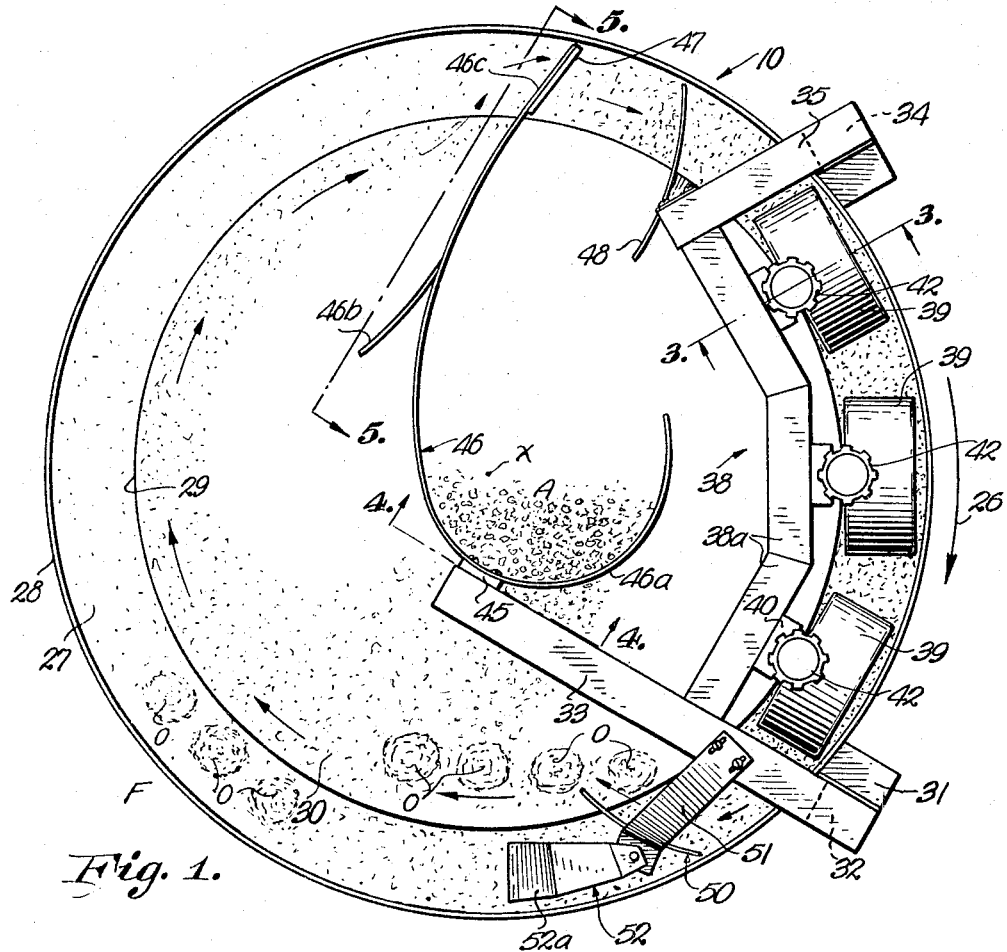
FIG. 1 is a top plan view of a preferred breading machine embodying the invention.
Figure 2:
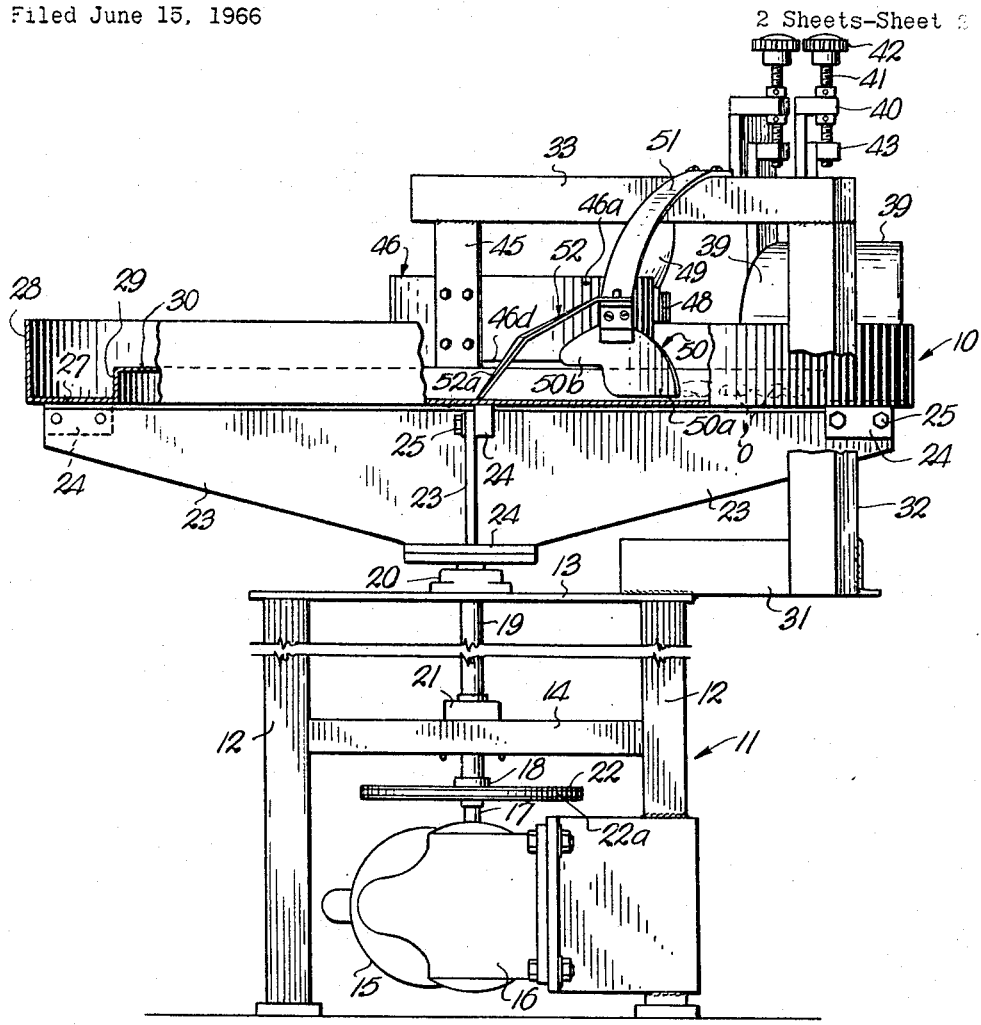
FIG. 2 is a side elevational view of same, parts of the turntable and supporting framework being broken away for purposes of illustration.

Referring to the drawings and initially to FIGS. 1 and 2, reference numeral 10 indicates generally a circular turntable which is rotatably supported on a base frame 11. The base frame 11 may be of any satisfactory shape and makeup, but in the illustrated embodiment it comprises four upright legs exemplified at 12 which cooperate the support the corners of a top platform 13. Brace members 14 are employed to interconnect the legs. The frame carries a motor 15 which is connected with a reduction gear unit 16 having the output shaft 17. Shaft 17 has a pulley 18 secured thereto.

Supported centrally in the table is a vertical drive shaft 19, the shaft being supported by thrust bearings 20, 21. At the lower end of shaft 19 is a large sheave or pulley 22. A V-belt 22a drivingly connects the small sheave 18 with the large sheave 22.

Secured to the upper end of shaft 19 is a spider arrangement comprising the four radially extending spokes or webs 23, which, as indicated, are preferably tapered in depth from the inside toward the outer end. The webs 23 are secured to radial flanges 24 which are carried by the upper end of shaft 19.

The circular turntable 10 is provided at 90° intervals on its underside adjacent the outer periphery with brackets 24 which are secured to webs 23 by bolts or fasteners 25. The turntable 10 is, of course, centered on the spider arrangement with the center of the turntable aligned with the axes of rotation of shaft 19.

The drive direction for the turntable is as indicated by the arrow 26 in FIG. 1, i.e. clockwise.

It will be noted that the turntable is so constructed as to provide an annular channel 27 around the periphery of the turntable. This channel has the outer wall 28 and the inner wall 29. The center portion of the turntable is a substantially horizontal platform 30 which is rimmed by the channel 27.

Returning again to FIG. 2, secured to and extending in cantilever fashion from the top 13 of the base frame is an arm 31. Arm 31 is welded or otherwise securely fastened at its inner end to the top of the table. At the outer end of the arm there is secured a vertical standard 32 which extends upwardly well to the outside of the periphery of the turntable 10 so as not to interfere with the rotation of the turntable. A return horizontal arm 33 is secured to the top of standard 32 and this proceeds inwardly across the top of the turntable but spaced well thereabove.

An arrangement similar to that just described but spaced some 75° counterclockwise from standard 32 is also present. This involves the upright standard 34 and the horizontally extending arm 35. It will be understood that arm 34 is supported in the same fashion as arm 32, i.e., from a horizontal arm extending (not shown) from the top of the table 13.

Extending between horizontal arms 33 and 35 in a generally arcuate arrangement is an elevated support structure 38 which in the illustrated embodiment comprises angle sections 38a joined end to end with one another and with the respective arms 33, 35. Each of these angle sections has connected therewith an assembly including a roller 39 which is oriented to coincide with the annular channel 27 in the turntable.

Figures 3, 5:
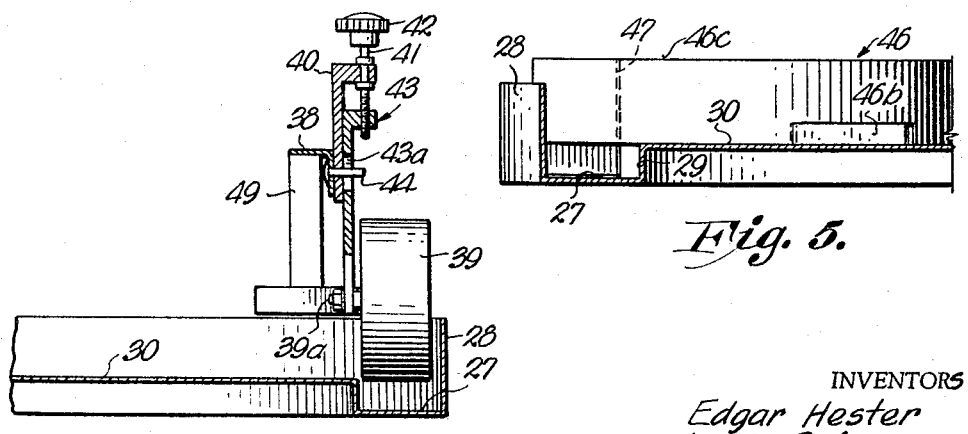
FIG. 3 is a fragmentary sectional view taken along the line 3—3 of FIG. 1 in the direction of the arrows.
FIG. 5 is a fragmentary sectional view taken generally along the line 5—5 of FIG. 1 in the direction of the arrows.

Since the support structure for each roller is the same as for the others, only one will be described with reference particularly to FIG. 3. As can be seen, extending upwardly from and secured to the angle section 38a is an inverted L-shaped member 40 having a horizontal leg in which is journaled a screw shaft 41. The shaft 41 is threaded and has a hand knob 42 at its upper end. The threaded lower end portion of the screw shaft is threadedly received in another inverted L-shaped member 43. This member has a vertical web which is slotted as at 43a, the slot being a vertical elongate slot. The protruding end of a stud 44 engages in the slot to assist in maintaining up and down vertical movement of the member 43 in response to thrust applied through the screw shaft 41. The roller 39 is journaled on a horizontal shaft 39a secured to and projecting from the lower end of member 43.

Preferably the rollers 39 each have a soft resilient outer surface, such as is provided by a flexible plastic foam. Alternatively, they may have a rubber or other relatively soft and resilient surface.

Referring again to FIGS. 1 and 2, it will be noted that the horizontal support arm 33 extends inwardly a goodly distance toward the center of the turntable. Depending from the arm at its inner end is a support bracket 45. This bracket has secured to it the curvilinear crumb guiding strip 46 which is preferably formed from an elongate rectangular strip of sheet metal.

The strip 46 is made up of three component sections, namely the sharply curved inner arcuate section 46a, the lower strip section 46b which is cut and bent away from the main section of strip 46 (see FIG. 5), and the outer section 46c which passes across and above the channel 27 in the turntable. A weight 47 is secured to the section 46c to insure that section 46b and the portions outwardly thereof along the lower edge of the strip will closely engage the surface 30 of the table to prevent crumbs from moving thereunder.

Figure 4:
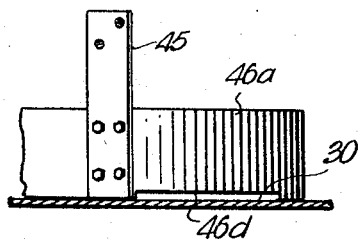
FIG. 4 is a fragmentary sectional view taken along the line 4—4 of FIG. 1 in the direction of the arrows.

As can be seen by reference to FIG. 4, the section 46a has an opening between it and the top surface 30 of the turntable so that crumbs can pass therebeneath. While we have shown an opening as provided by a slot 46d, it will be understood that in the absence of a slot the lower edge of the guide strip section 46a can be elevated slightly above the turntable to provide a space therebeneath. The weight 47 at the outer end of the guide will serve to hold the sections 46b and 46c down on the outer portion of the turntable.

Spaced from section 46c in the direction of rotation of the turntable is a second guide means 48 which is reversely curved with respect to section 46c but is supported at substantially the same elevation to catch any crumbs that pass section 46c and guide them back inwardly toward the center of the table. As can be seen in FIG. 3, this section 48 is supported by a depending bracket 49 secured to the arm 35.

On the other end of the roller group from the elements 46c and 48 is a second group of crumb and product controlling components. The main one of these comprises the plow section 50, the shape of which is best seen in FIGS. 1 and 2.

The plow is curvilinear in horizontal section and is so set that it intercepts and directs material in the channel 27 toward the interior of the table. Referring to FIG. 2, the lower portion 50a of the plow fits within the channel 27, extending substantially from sidewall to sidewall and closely adjacent the bottom thus to intercept the contents of the channel. A portion 50b forms an inner extension proceeding across the margin of the table top 30 for a short distance. The purpose of the plow will later be discussed in greater detail.

The plow is supported from a curved bracket or strap 51 which is secured at its upper end to the arm 33.

Adjacent the plow is located a crumb smoothing device 52 which is in the form of a bent section of sheet metal secured at its upper end to bracket 51 and having the blade-like portion 52a which fits down within the channel. This strip is of flexible metal and preferably is flexed slightly so as to bias the lower edge of the blade-like portion 52a toward the channel bottom.

In the operation of the machine, to load the machine with crumbs, crumbs are deposited from any suitable source, such as a pan or bucket, within the curvature of section 46a, into the zone A. It will be noted that the section 46a is located substantially to the right hand side of the axis X about which the turntable 10 rotates. The turntable is rotated and as the crumbs are fed into the zone A, they are swept around and toward and into contact with the inside of section 46a. The smaller crumbs, i.e., those most desirable for breading, will be carried through the slot 46d on around toward sections 46b and 46c.

As the crumbs come into contact with sections 46b and 46c, they are swept or deflected off the table 30 and into the channel 27. It will be noted that sections 46b, 46c are non-radial with respect to the axes X, thereby creating the necessary diversionary influence. The crumbs thus are scraped or guided into the channel and will be deposited in the channel to the height determined by the height of the lower edge of section 46c relative to the bottom of the channel. As will be seen, it is desired to have the crumb bed completely level as it moves toward the rollers; to this end the levelling action of section 46c is supplemented by the scraper section 48 which diverts any crumbs above the desired level back out onto the table 30 where they can be carried around again. It will be noted that the inner tip of section 48 is spaced radially outwardly a greater distance from axis X than is the terminal end of section 46a. The crumbs thus trailing off the inner tip of section 48 will bypass the section 46a and proceed around again on the next revolution.

As the crumb bed in channel 27 passes through the assembly of rollers 39, it is compacted by the roller pressure. Obviously, the pressure exerted by the rollers can be adjusted as desired through the manipulation of the hand knobs 42.

As the crumb bed moves past the last roller and comes into contact with the plow 50, it is diverted upwardly and inwardly onto the table 30 adjacent the periphery thereof. Not all crumbs are plowed out. Those which pass beyond plow 50 are smoothed and levelled by the scraper member 52 so that after crumbs have been fed to the machine and a complete revolution has taken place, the condition of the channel 27 as it approaches zone F (FIG. 1) is such that there is a shallow bed of crumbs within the channel which is substantially level across the channel. Of course, the thickness of this bed can be determined by adjustment of the depth of plow 50 and of the lower edge of the scraper 52.

The machine is now ready to receive the food products. Zone F represents the zone where an operator stands and feeds batter dipped products to the trough. In the drawing, we have shown onion rings O placed serially in the trough. These rings, of course, rest on the layer of crumbs earlier described, already in the trough. As the rings are moved on around by the turntable, eventually they pass serially beneath the guide section 46c. As they pass thereunder crumbs are deposited on the top of the product. The product is from this point forward and until the plow 50 is reached, sandwiched between the lower bed of crumbs and those which are deposited by means of the section 46c.

The rollers 39 act to firmly compress the crumbs in the channel, thus to apply them uniformly to all exposed surfaces of the product. While we have shown three rollers, two rollers or even one may do the job as well, although three rollers appear to be optimum.

When the product reaches the plow 50, both crumbs and product are plowed up out of the trough in the fashion earlier described so that the product is turned up and exposed and can be grasped by hand and removed as it moves towards zone F. As we have earlier seen, the removal of the product still leaves a layer or bed of crumbs within the channel 27 on which unbreaded product can be laid as the turntable continues to rotate.

If desired, a continuous crumb feed can be directed into zone A. However, we have found that sufficient crumbs as to handle most operations can be deposited in batch fashion.

The restricted opening 46d provided in the lower part of section 46a controls the size of crumb that will be passed onto the table 30 for subsequent diversion into the product channel. Thus large chunks are not fed into contact with the product and uniformity of breading is achieved. If large chunks accumulate within the confines of section 46a, they can be removed or broken into smaller particles by a spatula or other tool as desired.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments of the invention may be made without departing from the scope thereof, it is to be understood that all matter herein set forth or shown in the accompanying drawings is to be interpreted as illustrative and not in a limiting sense.

Having thus described our invention, we claim:

1. A breading machine for breading food products comprising
   a rotating turntable having a central table section rimmed by an annular food product receiving section,
   stationary crumb guide means positioned to deflect crumbs located on said table section from said table section into said annular section as said turntable rotates,
   compacting means associated with said annular section and operable to apply compacting pressure to the crumbs and products, and
   stationary product extraction means having a portion thereof in the path of crumbs and product in said annular section and operable to deflect said product inwardly from said annular section onto said table section as said turntable rotates.
2. A breading machine as in claim 1,
   said annular section comprising an annular channel in said turntable,
   said table section being elevated above the base of said channel.
3. A breading machine as in claim 1,
   said crumb guide means comprising a barrier strip positioned adjacent said table section and inclined from a radius through the axis of rotation in the direction of rotation of the turntable.
4. A breading machine as in claim 1,
   said compacting means comprising resiliently supported roller surfaces.
5. A breading machine as in claim 2,
   said product extraction means including a stationary plow structure within said channel.
6. A breading machine as in claim 5, including
   levelling means spaced from said plow means in the direction of rotation of said turntable and operable to level the crumbs remaining in said channel after passage through the plow means.
7. A breading machine as in claim 1, including
   means associated with said compacting means for adjusting compacting pressure.
8. A breading machine as in claim 1, including
   means for distributing bread crumbs from a central supply thereof to positions on said table section whereby they will subsequently be carried into contact with said crumb guide means as said turntable is rotated.
9. A breading machine as in claim 8,
   said means for distributing crumbs and said crumb guide means being provided by a single curve strip set on edge and positioned with its lower edge adjacent the top surface of said table section.

References Cited

UNITED STATES PATENTS

| | | | |
|---|---|---|---|
| 1,680,584 | 8/1928 | Angell | 118—24 X |
| 2,098,306 | 11/1937 | Porter | 118—416 |
| 2,240,384 | 4/1941 | Fulton | 118—416 |
| 2,855,893 | 10/1958 | Greer et al. | 118—24 X |
| 3,152,010 | 10/1964 | Case | 118—24 |
| 3,342,159 | 9/1967 | Jones | 118—28 |

MORRIS KAPLAN, *Primary Examiner.*